Aug. 6, 1946. R. M. LYNN 2,405,263
BOMB SIGHT
Filed Feb. 2, 1944 2 Sheets-Sheet 2
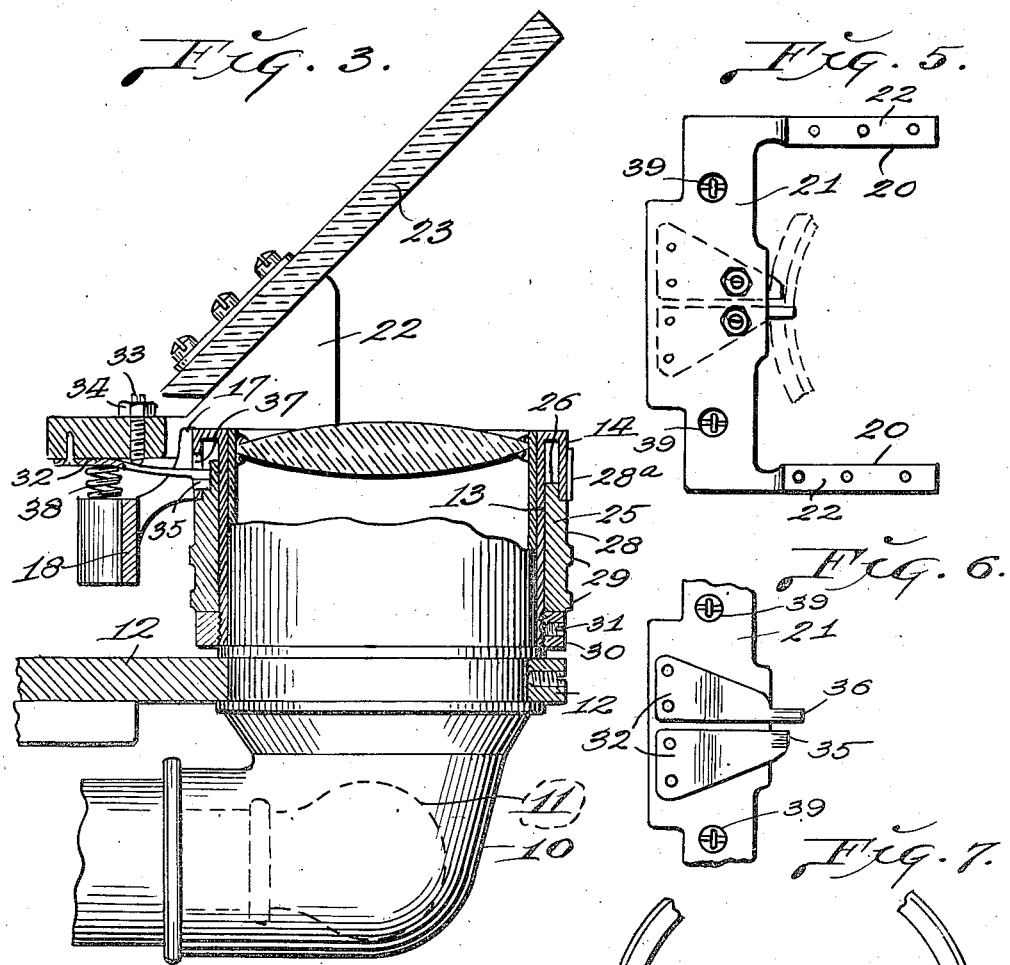
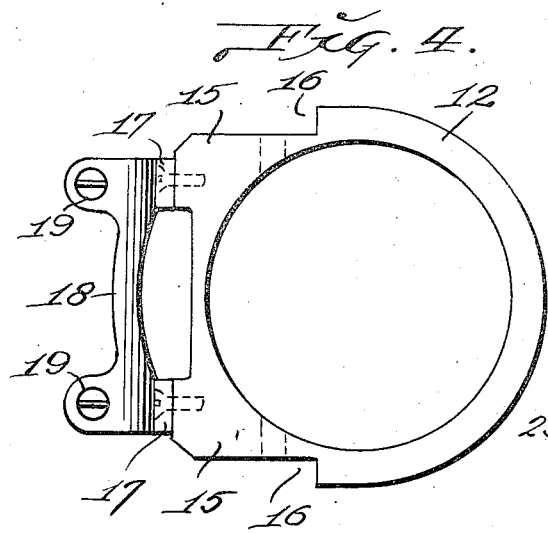
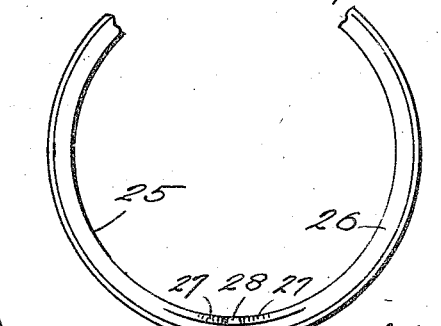
INVENTOR.
ROBERT M. LYNN.
BY
Martin P. Smith
ATTY.

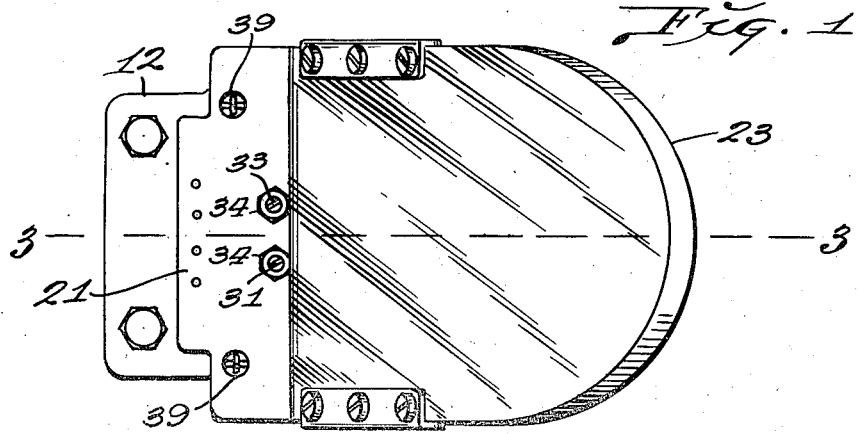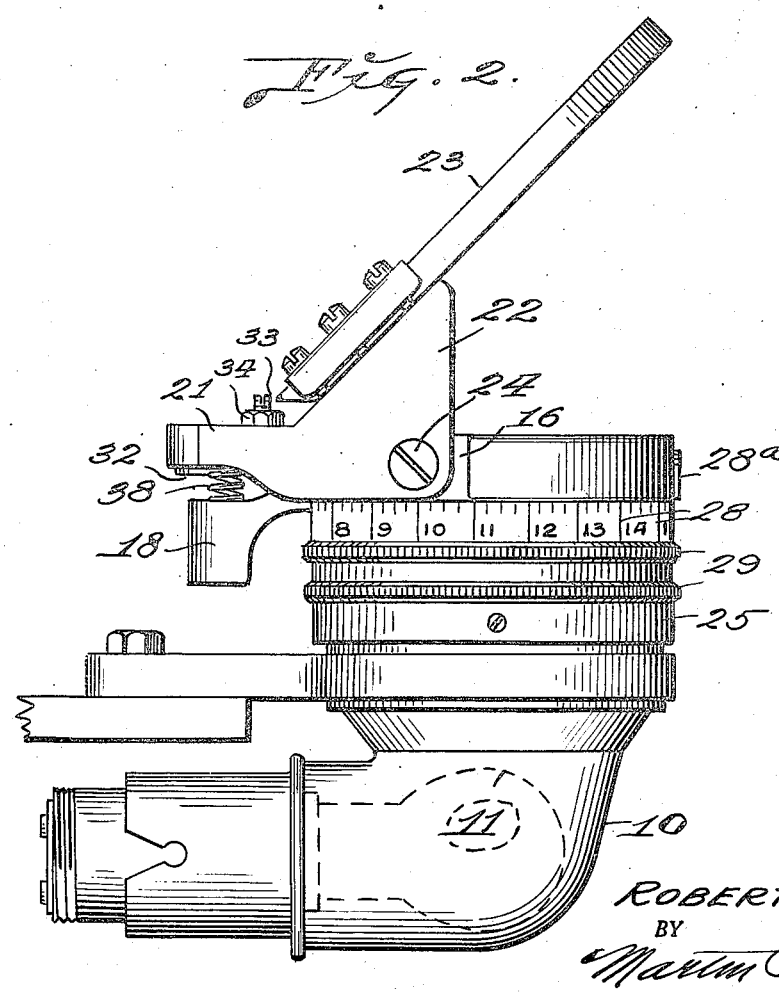

Patented Aug. 6, 1946

2,405,263

UNITED STATES PATENT OFFICE 2,405,263

BOMB SIGHT

Robert M. Lynn, Pasadena, Calif., assignor of twenty-five per cent to Clarence J. Harasta, twenty-five per cent to Julia M. Lynn, and twenty-five per cent to Mildred A. Harasta Application February 2, 1944, Serial No. 520,722

3 Claims. (Cl. 88—2.4)

My invention relates to a bomb sight, particularly designed for the orientation of bombing aircraft with respect to targets and for bringing about accurate control for the release of bombs and this invention is an improvement on the gun sight forming the subject matter of my co-pending application filed September 15, 1943, Serial No. 502,414.

The principal objects of my invention are to generally improve upon and simplify the construction of the existing forms of similar instruments, to provide a bomb sight based on the collimating reflex light principle, of compact lightweight structure and which may be easily and quickly adjusted so as to provide maximum accuracy of sighting as the equipped craft approaches a target.

A further object of my invention is, to provide an instrument of the character referred to which, while primarily designed for use as a bombing sight may also be advantageously employed for the sighting of aircraft guns.

A further object of my invention is to provide a bomb sight with a reflector and associated means for adjusting the angular position of said reflector and thereby change its axis in relation to the sight line or optical axis, thus achieving accuracy of results in bombing operations.

A further object of my invention is to provide a bomb sight which may be conveniently associated with any conventional lighting system, or arrangement, such as an electric lamp, or reflector, a collimator and a reticle.

With the foregoing and other objects in view, my invention consists in certain novel features of construction and arrangement of parts which will be hereinafter more fully described and claimed and illustrated in the accompanying drawings in which:

Fig. 1 is a plan view of my improved bomb sight.

Fig. 2 is a side elevation.

Fig. 3 is a vertical section taken approximately on the line 3—3 of Fig. 1.

Fig. 4 is a plan view of the ring frame which provides a support for the tilting reflector carrying member.

Fig. 5 is a plan view of the tilting reflector carrying frame.

Fig. 6 is a view looking against the under side of the central portion of the reflector carrying frame and showing the resilient cam engaging fingers.

Fig. 7 is a plan view of the cam ring with a portion thereof broken away.

Fig. 8 is a front elevational view of the cam ring with a part broken away.

Referring by numerals to the accompanying drawings which illustrate a preferred embodiment of my invention, 10 designates an elbow shaped housing containing in its lower portion, an electric lamp 11, above which is a lens assembly or collimator and reticle (not shown).

A base or mounting ring 12 surrounds and is detachably secured to the lower portion of the vertical leg of housing 10 and this base is mounted on a suitable fixed support so that said vertical leg normally occupies an upright position.

Mounted for rotary adjustment on that portion of housing 10 which extends above ring 12 is a sleeve 13 with the upper end of which is formed integral a depending wall 14 which is spaced apart from sleeve. Formed integral with the rear portions of the sides of said sleeve and wall, are rearwardly projecting shoulders 15, the sides of which are inset from the periphery of depending wall 14 thereby providing narrow notches 16.

Secured to the rear ends of shoulders 15 are ears 17 which project upward from the ends of a transverse frame 18, the latter being spaced apart from sleeve 13 and formed in the end portions of said frame are vertically disposed apertures 19.

Projecting upward from the parallel arms 20 of a substantially C-shaped frame 21, are brackets 22, to which are detachably secured the lower side portions of an inclined transparent reflector 23, and thus said reflector is disposed directly above the upright portion of housing 13 and the lenses, reticle and source of light therein.

Arms 20 of frame 21 are positioned in notches 16 and screws 24 which pass through the ends of said arms and are seated in ring 13, provide a horizontal axis for the reflector carrying frame 21.

Mounted for rotation on sleeve 13 is a ring 25, the upper portion of which projects a short distance upwardly between wall 14 and said sleeve and formed on the upper end of said ring is a cam 26 which extends approximately 360 degrees around ring 25. (See Figs. 7 and 8.)

Formed on top of ring 25 inwardly from the ends of cam 26, is a short double ended cam 27 provided with a centrally disposed notch 28.

That portion of the external face of ring 25 just below cams 26 and 27 is provided with suitable markings to form a graduated scale 28 and that portion of the face of the ring below said scale is knurled as designated by 29 to facilitate manual rotation of said ring.

Ring 25 is retained on sleeve 13 by a ring 30 screw seated on said sleeve below said ring 25 and this retaining ring 30 is secured to said sleeve by one or more set screws 31.

Suitably secured to the under face of the central portion of frame 21 are the rear ends of plates 32, of thin metal, the free forward ends of which tend to flex downwardly and the deflection of these plates is controlled by screws 33 which are seated in frame 21 above said plates and said screws are provided with lock nuts 34.

The forward end of one of the plates 32 is provided with a depending lug 35 which rides on cam 26 and the forward end of the other plate terminates in a short finger 36 which is adapted to ride on cam 27 and to engage in notch 28.

Finger 36 normally occupies a horizontal plane slightly above the surface of cam 26.

Formed in wall 14 is an aperture 37 through which the lug 35 and finger 36 project for engagement with the respective cams.

The upper portion of retractile springs 38 occupy apertures 39 in frame 21 with the upper ends of said springs suitably secured to said frame and the lower portions of said springs occupy and are secured with the apertures 19 in frame 18.

The tension of plates 32 is greater than that of springs 30 so that said plates 32 normally exert upward pressure on the rear portion of frame 21, thereby tending to rock same on its axis (the screws 24) and swing the reflector 23 forwardly.

The spring action of plates 32 allows for adjustment but otherwise they do not function as springs.

The relation between cams and plates 32 is such that when finger 36 is positioned in notch 28 (the gunnery position), the reflector is disposed at an angle of approximately 45 degrees relative to the light line of the instrument.

When the instrument is installed on the aircraft, it is mounted on a fixed support with base 12 parallel with the longitudinal (fore and aft) axis of the plane and with fingers 36 in notch 28, reflector 23 is maintained in proper position relative to the direction of fire from the guns.

In sighting during gunnery the operator looks through the reflector from which the image of the reticle is reflected and when the plane is guided so as to bring the target into the circle appearing on the reflector, with the dot of the reticle on said target, the gun or guns are fired, with maximum chances of scoring a hit, due to accuracy of sighting.

In bombing operations, it is necessary to change the angularity of the reflector with respect to the optical axis and this is accomplished by rotating ring 25 in one direction or the other, so that lug 35 riding on cam 26, will raise or lower depending on the direction of movement of the ring thereby tilting frame 22 and reflector until same is in the proper position relative to the light line. As lug 35 rides down cam 26, plates 32 will act to tilt frame 21 and reflector forward and as said lug rides upward on the cam surface, frame 21 is swung upward against the resistance of the coil springs 38.

Accuracy of adjustment of the reflector may be attained through the use of the graduated scale 28 and a cooperating guiding finger or mark 28a on the outer face of wall 14.

Thus the reflector adjusted to the speed and elevation of the equipped craft enables bombs to be released at the proper instant to insure maximum accuracy of hits on the target or objective, the images of which appear in the center of the image of the reticle seen on the reflector.

Thus it will be seen that I have provided a bomb sight which is simple in structure, inexpensive of manufacture and very effective in performing the functions for which it is intended.

It will be understood that minor changes in the size, form and construction of the various forms of my improved bomb sight may be made and substituted for those herein shown and described without departing from the spirit of the invention, the scope of which is set forth in the appended claims.

I claim as my invention:

1. In a bomb sight wherein a vertical housing contains a light source, reticle and collimator for producing a beam of light directed outwardly from said housing, and wherein a transparent reflector is angularly positioned over said beam of light, the combination of a device for tilting said reflector, comprising: a sleeve journaled on said housing, an axially directed cam on said sleeve; a bracket supporting said reflector on said housing, said bracket including a follower and means for urging said follower against said cam, whereby the angular position of said reflector varies in accordance with the circumferential displacement of said sleeve on said housing.

2. A combination as set forth in claim 1 wherein a pair of axial cams are provided on said sleeve, and a pair of followers coact respectively with said cams, one of said cams defining a helix, the other located at the completion of the convolution of said helix and being substantially M-shaped and forming a notch to locate said reflector in a predetermined angular relation with said housing and light beam.

3. In a bomb sight wherein a vertical housing contains a light source, reticle and collimator for producing a beam of light directed outwardly from said housing, and wherein a transparent reflector is angularly positioned over said beam of light, the combination of a device for tilting said reflector, comprising: a bracket pivotally mounting said reflector on said housing; a pair of levers extending from said bracket; means for adjusting the angular relationships of said levers relative to each other and said bracket; a pair of cams incorporated in said sleeve and engageable respectively by said levers; means tending to rotate said bracket to cause at least one of said levers to bear against its cam whereby the angular relationship of said reflector is maintained in predetermined correspondence with the circumferential displacement of said sleeve on said housing.

ROBERT M. LYNN.